United States Patent [19]
Allen et al.

[11] Patent Number: 5,035,259
[45] Date of Patent: Jul. 30, 1991

[54] FLUID FLOW CONTROL VALVE

[75] Inventors: William P. Allen, Staine; Peter Miles, Crowthorne, both of England

[73] Assignee: Chubb Fire Limited, England

[21] Appl. No.: 568,387

[22] Filed: Aug. 16, 1990

[30] Foreign Application Priority Data

Aug. 19, 1989 [GB] United Kingdom ................. 8918960

[51] Int. Cl.⁵ ........................... F16K 7/06; F16K 7/07; F16K 31/128

[52] U.S. Cl. ............................. 137/488; 137/636.1; 137/863; 251/5; 251/331

[58] Field of Search ....................... 137/488, 636.1, 863; 251/5, 331

[56] References Cited

U.S. PATENT DOCUMENTS

| | | | |
|---|---|---|---|
| 2,519,448 | 8/1950 | Fairchild | 137/636.1 |
| 2,812,154 | 11/1957 | Nordstrand | 251/331 X |
| 2,881,958 | 4/1959 | Sheen | 251/331 X |
| 2,928,421 | 3/1960 | Nordstrand | 251/331 X |
| 3,371,677 | 3/1968 | Connolly . | |
| 3,433,454 | 3/1969 | Falkenblad et al. | 251/331 |
| 3,468,344 | 9/1969 | Sanford | 251/331 X |
| 3,477,693 | 11/1969 | Bezanis | 251/331 X |
| 3,515,169 | 6/1970 | Berg et al. | 251/331 X |
| 3,543,796 | 12/1970 | Durant | 251/331 X |
| 3,757,583 | 9/1973 | Ludewig | 251/331 X |
| 3,942,756 | 3/1976 | Brumm et al. . | |
| 4,138,087 | 2/1979 | Kruse et al. | 251/5 |

FOREIGN PATENT DOCUMENTS

| | | | |
|---|---|---|---|
| 0061252 | 9/1982 | European Pat. Off. . | |
| 904565 | 8/1962 | United Kingdom | 251/331 |
| 988509 | 4/1965 | United Kingdom . | |
| 1571324 | 7/1980 | United Kingdom . | |

Primary Examiner—Gerald A. Michalsky
Attorney, Agent, or Firm—Jerry A. Miller

[57] ABSTRACT

A valve for use e.g. as a pilot valve in an offshore water deluge fire fighting system has a ported cylindrical body and an elastomeric sleeve defining between them an annular passage for flow between the various ports. Selected ports can be closed by means of captive balls which are cammed out by a central spool to deform localized areas of the sleeve into sealing contact with the housing wall surrounding the port openings. In this way the moving parts of the valve are isolated from the fluid by the sleeve and problems of sticking, e.g. caused by salt deposits when used with seawater, are avoided. In another embodiment, a flat pad of elastomeric material is used to the same effect in a ported body defining a planar flow passage.

13 Claims, 4 Drawing Sheets

FLUID FLOW CONTROL VALVE

BACKGROUND

The present invention relates to fluid flow control valves.

In one particular aspect the invention is concerned to provide a valve construction which is amenable to service as a pilot valve controlling the operation of a main water valve in a deluge fire-fighting system for an offshore platform, or in some other marine environment, where the working fluid is seawater. The salt deposits associated with this medium cause problems with valve elements exposed to the water which depend for their operation on sliding contact; such valves can be caused to stick or to seize altogether—with potentially disastrous results in the context of a fire-fighting system. Similar problems can arise in water-irrigation systems. Valves in accordance with the invention avoid such contact and are therefore particularly useful for the control of fluids which leave solid deposits. For the same reason they may also be found particularly useful in the control of corrosive fluids which would otherwise tend to destroy the sealing integrity of sliding valve members. The invention is not, however, restricted to use for the control of these "difficult" fluids and may find general application in the control of liquid and gas flows.

From United Kingdom patent specification no. 988509 there is known a fluid flow control valve comprising a cylindrical housing having axially spaced inlet and outlet ports opening through its wall, an axial slide member provided within the housing to close and open passages between the ports, and a rubber sleeve interposed between the housing and slide member. This sleeve is dimensioned such that a passage connecting the ports is normally free along the inside of the cylindrical housing wall but the slide member is provided with one or more "pistons" (or lands) which expand the surrounding sleeve portion into sealing contact with the facing portion of the housing wall, whereby the passage for fluid flow between the ports can be closed selectively by the movement of the slide member. In a valve of this kind the slide member can therefore be isolated from contact with the fluid by the surrounding rubber sleeve.

Problems can arise in the operation of such a valve, however, owing to the high level of friction between the slide and the rubber sleeve. The movement of the slide will tend to be jerky and require excessive force, and the sleeve may exhibit substantial hysteresis. These problems will be exacerbated by operation at high fluid pressures which will tend to compress the sleeve even more tightly around the slide. In the aforesaid patent specification an embodiment is proposed in which a further sleeve, of a substantially inelastic but flexible material having a lower coefficient of friction than the rubber sleeve, is interposed between the slide and the rubber. This inner sleeve is dimensioned such that its introduction causes a dilation of the outer rubber sleeve and at selected axial positions it has weakened sections provided by a peripheral row of spaced axial slits which will cause circumferential indentations when they are axially remote from supporting lands of the slide. When the slide is moved the lands will straighten said indented sections to assume cylindrical shape and the corresponding sections on the outer sleeve, provided with circumferential beads, will be forced out against the wall of the surrounding housing. The intricate form of this inner sleeve would be expensive to produce, however, and in any event it could only provide a partial solution to the problem of friction. As another solution to this problem, the aforesaid patent specification alternatively proposes to perforate the rubber sleeve to provide an equal fluid pressure on the interior and exterior of the sleeve and thereby reduce the contact pressure with the slide. This expedient, however, destroys the function of the sleeve in isolating the slide from contact with the fluid.

SUMMARY OF THE INVENTION

In a first aspect the present invention seeks to provide a fluid flow control valve permitting isolation from the fluid of its sliding or otherwise moving control parts while avoiding the frictional problems inherent in a valve of the kind disclosed in the aforesaid patent specification and accordingly in this aspect resides in a valve comprising: a housing or other solid body having a surface which defines one boundary wall of a passage for fluid flow; an elastomeric member mounted with an exterior surface thereof facing but spaced from said solid body surface whereby to define another boundary wall of said passage; at least two spaced-apart ports opening into said passage through said solid body surface; at least one movable control element juxtaposed to the surface of said elastomeric member on its side opposite to said exterior surface; and a movable actuating member juxtaposed to said control element(s) and formed with one or more selected cam surfaces therefor; whereby movement of the actuating member is effective to displace the or selected said control element(s) against the elastomeric member, in a direction generally perpendicular to the movement of the actuating member and to the adjacent surface of the elastomeric member, thereby to deform one or more selected portion(s) of the elastomeric member into sealing contact with the facing solid body surface so as to control intercommunication through said passage for fluid flow between the or selected said ports.

In a valve according to the invention, therefore, the only parts which need to be exposed to the fluid are the (stationary) solid body and the deformable elastomeric member. The sliding or otherwise movable actuating member and the aforesaid control element(s) are isolated from the fluid by the elastomeric member. The spacing between the exterior surface of the elastomeric member and the facing solid body surface can be such as to ensure e.g. that the valve does not become clogged by salt deposits when used with seawater, and the elastomeric member can provide a good seal against the facing solid body surface notwithstanding a degree of corrosion or deposit thereon. At the same time, problems of friction and hysteresis are avoided by the camming action of the actuating member and control element(s) in lieu of sliding contact between the actuating member and elastomeric member. In a preferred embodiment, the or each aforesaid control element comprises a ball trapped in a respective bore formed in a housing member disposed between the actuating member and the elastomeric member, and is located to deform the elastomeric member into sealing contact with the solid body surface around the opening of a respective said port.

Valves in accordance with the above-defined aspect of the invention may be constructed with a cylinderical geometry, i.e. where the solid body defines an outer cylindrical boundary wall of the aforesaid flow passage, the elastomeric member is in the form of a sleeve disposed coaxially within the body, the actuating member is in the form of a spool extending coaxially through the sleeve, and the control element(s) are cammed generally radially between the spool and the sleeve. However, other geometries are equally possible, including in particular the planar geometry of which an example is more fully described hereafter.

The invention also resides per se in a main fluid flow control valve of the kind comprising an inlet and an outlet separated by an impervious central barrier on a pervious support structure; a flexible sleeve surrounding said structure; an annular control chamber surrounding said sleeve; and control means for controlling the admission and release of fluid to and from said control chamber, whereby the flexible sleeve is held in sealing contact with the barrier to prevent fluid flow from said inlet to said outlet or is released from the barrier to permit fluid flow from said inlet to said outlet, in dependence upon the volume of fluid within said control chamber; wherein said control means comprise a pilot valve constructed in accordance with the first aspect of the invention.

BRIEF DESCRIPTION OF THE DRAWINGS

These and other features of the invention will now be more particularly described, by way of example, with reference to the accompanying drawings in which.

DESCRIPTION OF THE PREFERRED EMBODIMENTS

Figure 1:
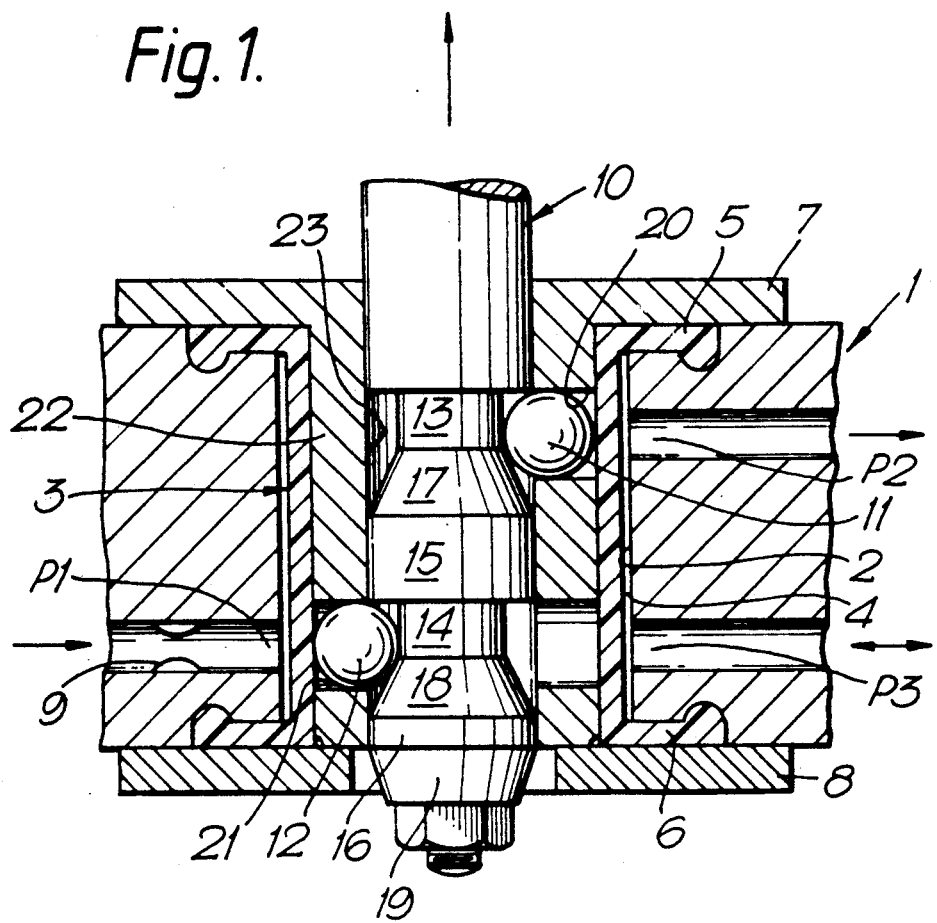
FIGS. 1 and 2 are respective axial sectional views through one preferred embodiment of a flow control valve constructed in accordance with the present invention, in two operational conditions.

Referring to FIG. 1, the illustrated valve comprises a body 1 having a cylindrical bore 2 within which is coaxially disposed an elastomeric sleeve 3. The unstretched external diameter of the sleeve 3 is rather less than the internal diameter of the bore 2 so that there is defined therebetween an annular space 4 for fluid flow as more particularly described below. The ends of this space are sealed by integral flanges 5, 6 of the sleeve 3 and the sleeve is retained to the body 1 by end plates 7, 8.

Opening through the body 1 into the space 4 are three ports P1, P2 and P3. Ports P1 and P2 are axially spaced apart at opposite angular positions with respect to the bore 2, while port P3 is disposed diametrically opposite to port P1. For the sake of this description it is assumed that P1 is connected to a source of pressurised fluid and has a variable restrictor 9 associated with it, P2 is connected to a drain for the fluid and P3 is connected to a device utilising the fluid. Furthermore, the valve is to be operable so as selectively to connect all three ports together, or to isolate all three ports from one another, or to connect P1 to P3 while isolating these two ports from P2. The remaining components of the valve accordingly comprise an actuator or spool 10 which is reciprocable coaxially within the sleeve 3 and a pair of control elements in the form of balls 11 and 12 which selectively occlude ports P2 and P1 in dependence upon the axial position of the spool 10.

More particularly, the spool 10 is provided with upper and lower grooves 13,14 and upper and lower lands 15,16 joined by respective frustoconical cam surfaces 17,18. A further frustoconical cam surface 19 of opposite slope is provided below the land 16. The balls 11 and 12 are trapped in respective radial bores 20,21 provided opposite to ports P2 and P1 in a cylindrical housing portion 22 integral with the end plate 7. The spool 10 is borne slidably within a central bore 23 of the member 7/22 and the sleeve 3 is a close fit around the exterior of the housing portion 22.

In the condition of the valve illustrated in FIG. 1, with the spool 10 in its lowermost position, the balls 11,12 are in register with respective grooves 13,14 of the spool. In this condition the sleeve 3 is free of influence by the balls and all three ports P1, P2 and P3 intercommunicate through the annular space 4. Pressurised fluid can therefore be supplied from P1 to both P2 and P3. As the spool 10 begins to rise (in the sense as viewed in the Figure), however, the balls 11,12 are progressively cammed out by the respective surfaces 17,18 so as to deform the adjacent localised portions of the wall of the sleeve 3 towards the openings of P2 and P1. When the spool has been raised to the position shown in FIG. 2, the balls 11,12 now register with respective lands 15,16 and reach their maximum radial displacement, in which the adjacent portions of the sleeve 3 are deformed into sealing contact with the cylindrical bore 2 around the openings of P2 and P1. All three ports P1, P2 and P3 are therefore effectively isolated from one another. If the spool 10 is raised further from this position the ball 12 will begin to run down the cam surface 19 from the land 16; the ball 11, however, will remain engaged by the land 15 which has a greater axial extent than the land 16. Accordingly, this action will begin to open up port P1 once more, allowing fluid flow through the space 4 to port P3, while port P2 remains closed. Conversely, if the spool 10 is lowered from its FIG. 2 position both balls 11 and 12 will begin to run down their respective cam surfaces 17,18 and begin to open both ports P2 and P1. By virtue of the restrictor 9 associated with P1, however, if the device connected to P3 has been pressurised to the same level as the source connected to P1, this action will result in a net flow of fluid out of P3 and through the space 4 to P2.

Figure 3:
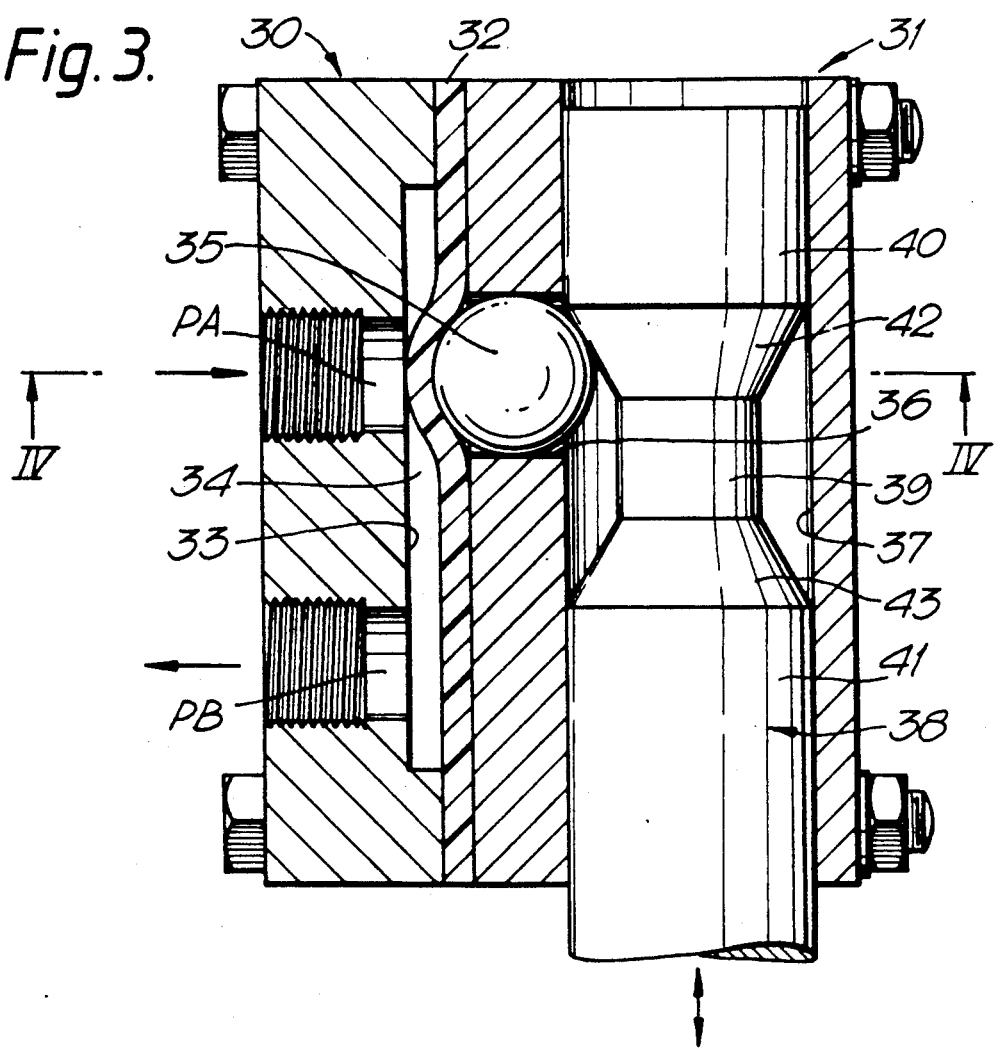
FIG. 3 is a longitudinal sectional view through another preferred embodiment of a flow control valve constructed in accordance with the invention.
Figure 4:
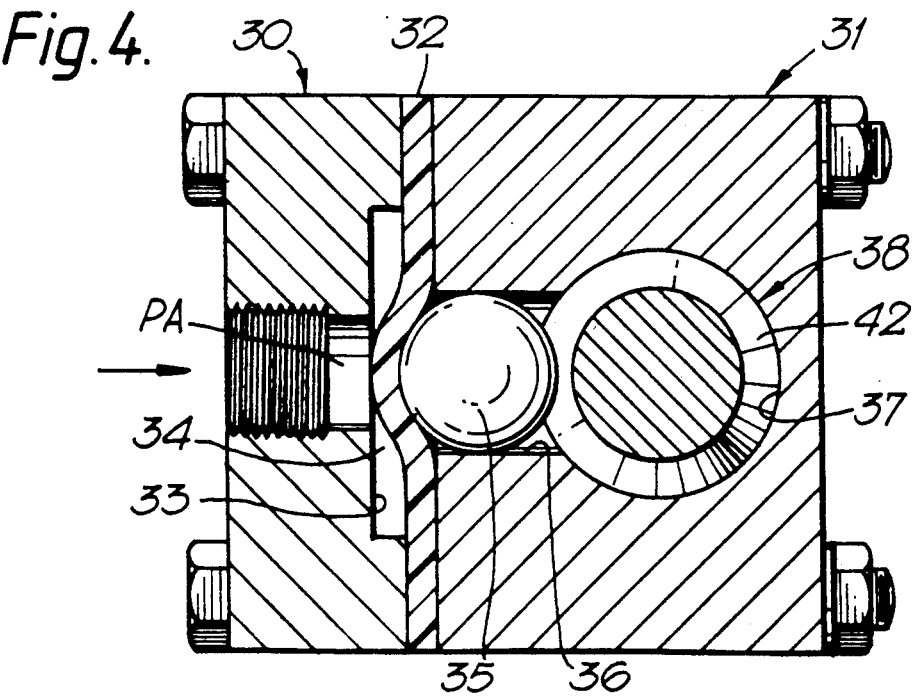
FIG. 4 is a section on the line IV—IV of FIG. 3.

Turning now to FIGS. 3 and 4, the valve illustrated therein comprises two housing blocks 30 and 31 bolted together and trapping between them a flat elastomeric pad 32. The housing block 30 is undercut at 33 so as to define, together with the facing surface of the pad 32, a passage 34 for fluid flow between inlet and outlet ports PA and PB which open though the undercut wall 33. Facing the port PA, on the opposite side of the pad 32, is a control element in the form of ball 35 trapped in a bore 36 in the block 31. The block 31 also has a longitudinal bore 37 through which is slidably borne an actuator or spool 38.

The spool 38 has a groove 39 and upper and lower lands 40,41 joined by respective frustoconical cam surfaces 42,43 When the ball 35 is in register with the groove 39 (not as illustrated) it lies wholly within the confines of the bores 36/37 and the pad 32 can lie completely flat against the block 31. As the spool is lowered or raised from that position, however, the ball 35 is progressively cammed out by the surface 42 or 43 so as to deform the adjacent localised portion of the pad 32 towards the opening of the port PA, as shown in FIGS. 3 and 4. The flow through passage 34 from PA to PB is thereby progressively throttled until, when the ball registers with the land 40 or 41, the adjacent portion of the pad 32 is deformed by its maximum extent into sealing contact with the wall 33 around the opening of PA, thereby shutting off the flow to PB.

Figure 2:
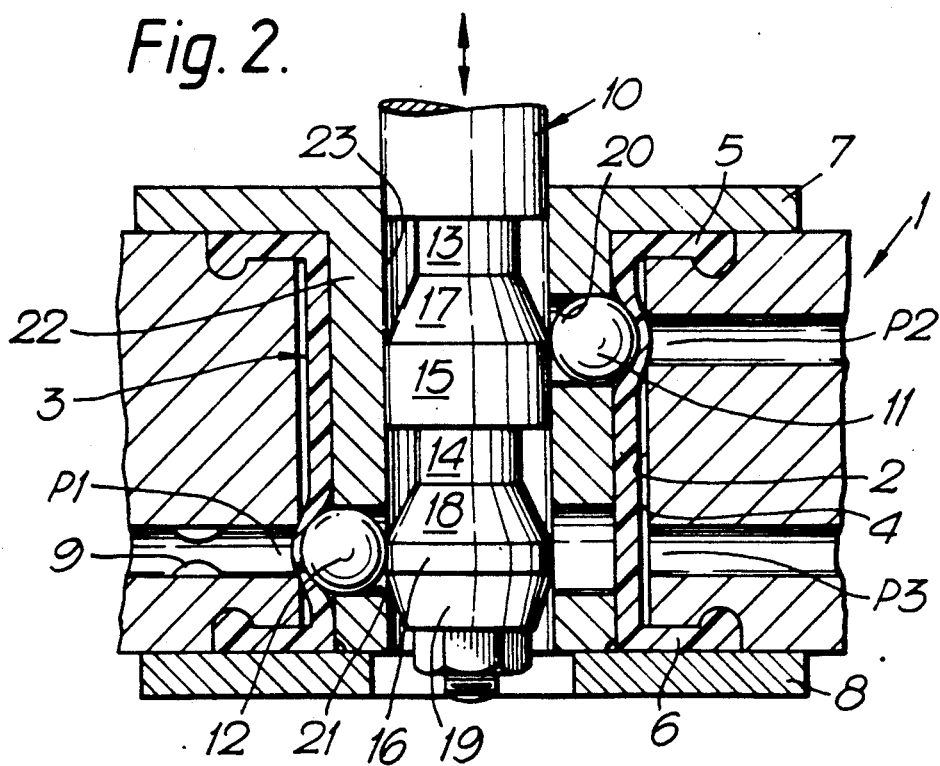

For a given overall size of the structure, a valve of the planar geometry of FIGS. 3 and 4 may be configured to provide a greater flow capacity than a valve of the cylindrical geometry of FIGS. 1 and 2.

From consideration particularly of FIGS. 3 and 4 it will be appreciated how a valve in accordance with the invention can be operated to provide not only on-off control of a fluid flow but also progressive modulation over a range of flow rates, by adjustment of the degree of deformation of the elastomeric member (in this case the pad 32) by the associated control element (in this case the ball 35) in accordance with the characteristics of the associated cam surface (in this case the spool surface 42).

Figure 5:
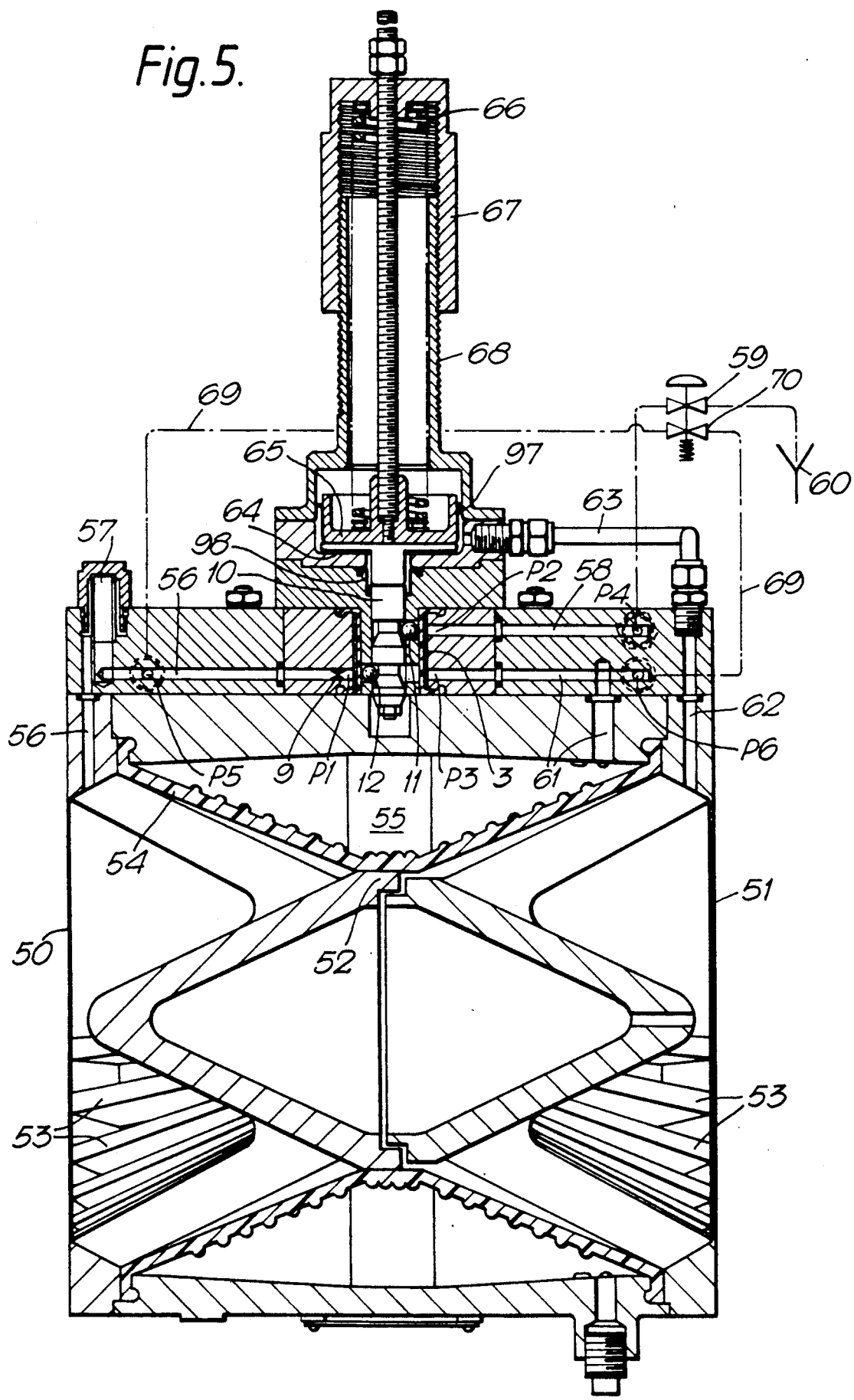
FIG. 5 is a sectional view of a sleeve-type main water valve with the valve of FIGS. 1 and 2 incorporated as a pilot therefor.

Turning to FIG. 5, the operation of a valve of the kind shown in FIGS. 1-2 as a pilot controlling a main water valve will now be described.

The main valve shown in FIG. 5 is of a generally known sleeve type (of which examples are disclosed in U.S. Pat. Nos. 3,371,677 and 3,942,756 and European patent specification no. 0061252), having an inlet 50 and an outlet 51 separated by a central barrier 52 supported by ribs 53. Surrounding the barrier 52 is a flexible sleeve 54 which is either held in sealing contact with the barrier (as shown), thereby preventing flow through the valve, or is released from the barrier to permit flow through the valve, in dependence upon the volume of water admitted to an annular control jacket 55 surrounding the sleeve. For the sake of this description it is assumed that this valve is provided in a feed main for a seawater deluge fire-fighting system and is normally to be held closed against high pressure water at the inlet 50, but when required must open rapidly to provide a water flow at regulated pressure from the outlet 51.

The pilot valve structure of FIGS. 1-2 is mounted integrally with the main water valve and is connected hydraulically with the main valve as follows. That is to say port P1 of the pilot valve is connected to the main water inlet 50 through a conduit 56 which includes a strainer 57 and the adjustable restrictor 9; port P2 of the pilot valve is connected through a conduit 58 and port P4 to the pneumatically operated on-off valve 59 to be described hereinafter with reference to FIG. 6, and thence to a drain outlet 60; and port P3 of the pilot valve is connected to the control jacket 55 of the main valve through a conduit 61.

In the initial "off" condition of the main water valve, the pilot valve is in the condition shown in FIGS. 1 and 5 so that all three ports P1, P2 and P3 intercommunicate through the space 4—and air pressure is applied to the pneumatic valve 59 to close off conduit 57. High pressure water from the main valve inlet 50 therefore passes through the pilot valve from P1 to P3 to fill the control jacket 55 and keep the sleeve 54 in contact with the barrier 52. When the main valve is to be opened, however, the pneumatic signal to valve 59 is released, thereby opening port P2 to the drain outlet 60 through conduit 57. The pilot valve is still in the condition of FIG. 1 at this stage, i.e. all three ports P1, P2 and P3 are in communication with one another. However, flow into the pilot valve from P1 is throttled by the restrictor 9 in conduit 56, while there is no equivalent restriction on flow into the pilot valve through port P3 or out through port P2. The net effect is therefore that water now begins to flow out of the control jacket 55 through port P3 and through port P2 to the outlet 60 thereby permitting the main valve sleeve 54 to move off the barrier 52 and open the main valve to flow from the inlet 50 to the outlet 51.

As water flows through the main valve and the pressure at the outlet side 51 accordingly rises, the pilot valve spool 10 is drawn upwardly (in the sense as viewed in FIGS. 1 and 5). This is because the pressure at the main outlet 51 is tapped through a conduit 62 and pipe 63 to a chamber 64 on the underside of a piston 65 to which the spool 10 is bolted, the hydraulic pressure on the piston 65 being applied in opposition to the pressure of a spring 66 which is trapped between the piston and a cap 67 screwthreadedly engaged with a cylinder 68. As the spool rises, both balls 11 and 12 will be cammed outwardly to their full extents to lie on lands 15 and 16 as shown in FIG. 2, thereby closing both ports P2 and P1 through deformation of the sleeve 3. In this condition, therefore, the remaining volume of water within jacket 55 is effectively trapped and this sets the degree of opening of the main valve (i.e. the spacing of the sleeve 54 from the barrier 52) and thereby regulates the pressure and flow at the outlet 51. In order to adjust this outlet pressure the cap 67 can be screwed up or down on the cylinder 68 to decrease or increase the spring pressure on piston 65, thereby decreasing or increasing the pressure at outlet 51 which is required in order to shift the spool 10 in opposition to the spring pressure to its "set point" of FIG. 2 at which ports P1 and P2 are closed. The speed and sensitivity of the valve operation can be adjusted by means of the adjustable restrictor 9 associated with port P1.

If, with the valve system running at its "set point", there is a significant increase in the supply pressure at the main valve inlet 50—and consequently also at the outlet 52—this increase will be transmitted to the piston 65 which will accordingly raise the pilot valve spool 10 up past its "set point". As previously discussed with reference to FIG. 2, the axial length of the land 15 is greater than that of the land 16 and accordingly as the spool rises further the ball 12 will begin to move inwards along cam surface 19 to open port P1 while port P2 still remains closed. Water can therefore flow from the inlet 50 through port P1 to port P3 and into the jacket 55 to reduce the opening of the main valve until the pressure at the outlet 51 has reduced to the desired level and the piston 65 correspondingly falls to close P1 and lock the volume of the jacket 55 once more. Conversely, if the supply pressure—and consequently also the pressure at outlet 51—falls significantly, this decrease will be transmitted to the piston 65 which will accordingly lower the pilot valve spool 10 down past its "set point" under the pressure of the spring 66. When this occurs it will be appreciated from the previous description that both ports P1 and P2 will be opened by the inward movement of the balls 11 and 12 along their spool cam surfaces 17 and 18 but by virtue of the restrictor 9 associated with P1 there will be a net flow of water out of the jacket 26 through P3 to P2. The main valve will consequently open further to redress the loss of pressure at the outlet 51, the valve spool 10 subsequently returning to its "set point" under the control of the piston 65 to lock the (increased) volume of the jacket 55 once more.

In order to shut down the illustrated main water valve once the pilot valve is running at its "set point", it is necessary to override the pilot operation and connect the main water inlet pressure directly to the jacket 55. Merely closing the on-off valve 59 by reapplication of its pneumatic signal would have no immediate effect on the main valve because at the "set point" the port P2 is already closed. Accordingly, and as schematically illustrated in FIG. 5, a port P5 leading from conduit 56 is connected to a port P6 opening to conduit 61 via pipework 69 which bypasses the pilot valve and includes an open-close valve 70 ganged with the valve 59 but operating in the opposite sense, i.e. as valve 59 is opened valve 70 closes and vice versa.

To shut down the main valve, therefore, valve 70 is opened and valve 59 simultaneously closed. High pressure water from the main inlet 50 is accordingly supplied from port P5 through valve 70 to port P6 and into the jacket 55 until the latter is filled and the main valve sleeve is reseated upon the barrier 52. As the pressure at the main outlet 51 accordingly decays, the piston 65 is driven down by the spring 66 and returns the pilot valve spool 10 to its FIG. 1 position, thereby opening the jacket 55 to the main inlet pressure also through the pilot valve. When the main valve is to be opened again, the on-off valve 59 is opened while the valve 70 is simultaneously closed. The bypass connection from P5 to P6 is accordingly interrupted and plays no further part in the operation until shut down, control of the main valve opening being assumed by the pilot valve all as described above.

Figure 6:
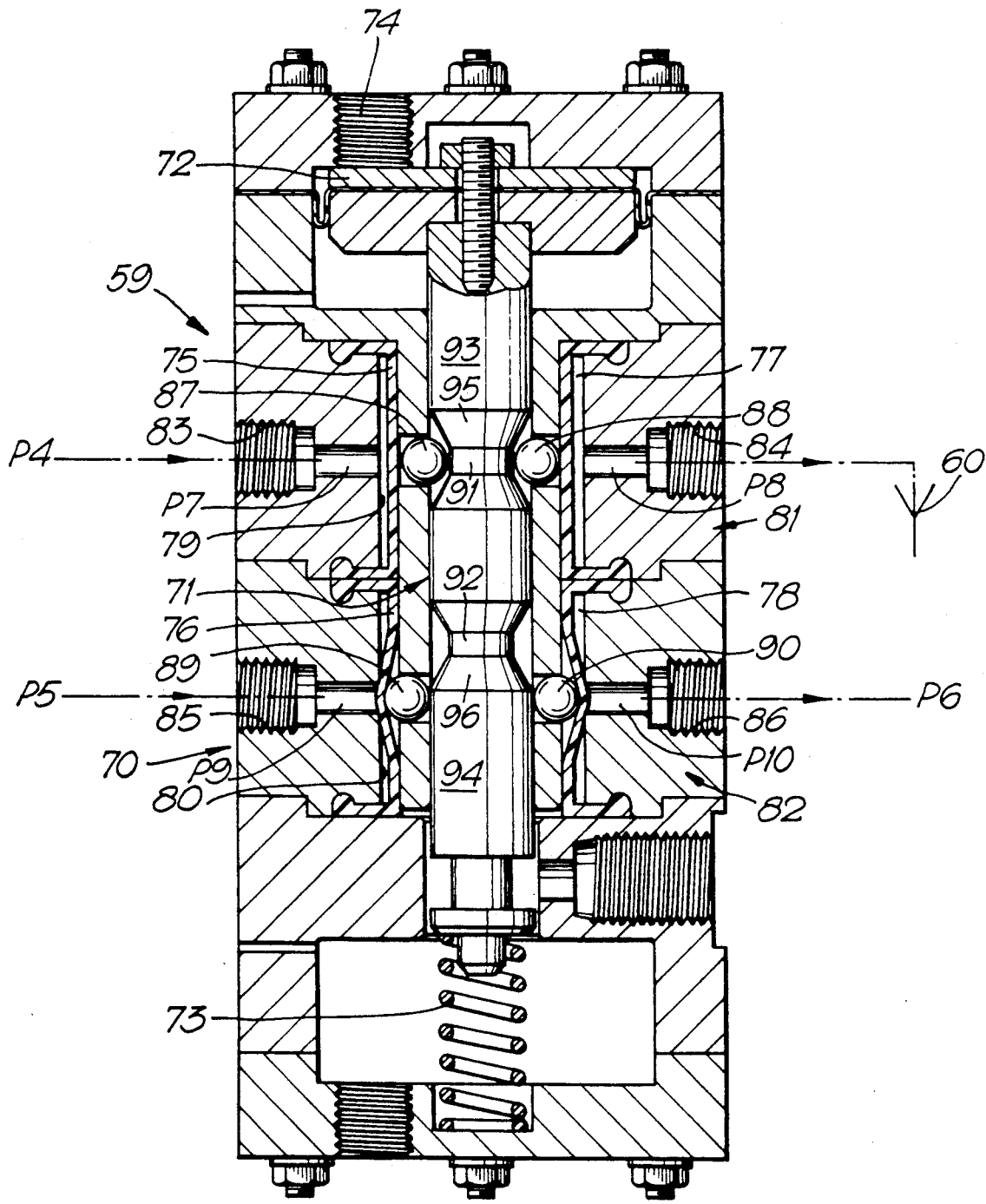
FIG. 6 is a sectional view of another embodiment of valve in accordance with the invention for use as an on-off control valve for the main valve of FIG. 5.

A practical embodiment of the ganged valve 59/70 is illustrated in FIG. 6. It is shown in the condition which pertains while the main water valve is open, i.e. when valve 59 is open and valve 70 is closed. A central spool 71 carries a pneumatic piston 72 at one end and is acted upon at its other end by a return spring 73. When air pressure is applied to inlet 74 the spool 71 is driven downwards (in the sense as viewed in the Figure) by the piston 72 but when the pressure is released the spool is driven to its illustrated position by the spring 73. Each valve 59,70 represents an individual embodiment of the invention constructed in accordance with the same principles as the pilot valve of FIGS. 1-2. That is to say, each comprises an elastomeric sleeve 75,76, (which may be identical to the sleeve 3), defining an annular flow passage 77,78 with the cylindrical bore 79,80 of a surrounding body 81,82. A pair of diametrically opposite ports P7,P8 and P9,P10 open to the respective spaces 75,76, these ports being connected through respective unions 83-86 to: port P4 of the main valve; drain outlet 60; port P5 of the main valve; and port P6 of the main valve. Flow through each pair of ports is controlled by respective balls 87-90 which can be cammed out in pairs by the spool 71 to deform the adjacent portions of the sleeve 75 or 76 into sealing contact with the cylindrical wall around the respective port opening. More particularly, the spool 71 has two grooves 91,92 between lands 93,94 and intermediate cam surfaces 95,96 axially spaced apart such that when, as illustrated, no air pressure is applied to inlet 74, balls 89 and 90 are cammed out to close ports P9 and P10 while ports P7 and P8 remain open but, with air pressure applied to inlet 74, balls 87 and 88 are cammed out to close ports P7 and P8 while ports P9 and P10 remain open.

The spool of a valve of the kind shown in FIG. 6 could be actuated by various alternative means instead of an on-off pneumatic signal. Thus for example it could be pneumatically operated in contrary senses at opposite ends, it could be operated by oppositely-acting solenoids at each end, or could simply be operated manually. A valve of this form is particularly advantageous when solenoid operation is required as the sleeves 75,76 can ensure complete isolation of the working fluid from the electrical components.

It will be appreciated that in any of the valves of FIGS. 1 to 4 and 6 the only "moving" part in contact with the working fluid is the elastomeric member 3,32 77 or 78. This can readily be formulated from an elastomer resistant to aggressive working fluids such as seawater, e.g. from neoprene; the body 1, 30, 81 or 82 and other parts of the main valve of FIG. 5 can in this case be made e.g. from bronze, gunmetal or stainless steel. The chamber 64 in FIG. 5 is sealed against the moving piston 65 and spool 10 by flexible diaphragms 97 and 98.

Although described above in terms of service as pilot or on-off valves for a main water valve these are but examples of the application of valves in accordance with the invention. The number, size, shape and position of the ports, the configuration of the sleeve or other elastomeric member and the profile of the control elements and spool or other actuating member in a valve according to the invention is open to extensive variation to meet any particular requirements for the selective control of fluid flows. Cylindrical embodiments can also readily be envisaged where selective deformation of the elastomeric sleeve is effected by rotational movement of the corresponding spool instead of, or in combination with, axial movement.

We claim:

1. A main fluid flow control valve of the kind comprising an inlet and outlet separated by an impervious central barrier on a pervious support structure; a flexible sleeve surrounding said structure; an annular control chamber surrounding said sleeve; and control means for controlling the admission and release of fluid to and from said control chamber, whereby the flexible sleeve is held in sealing contact with the barrier to prevent fluid flow from said inlet to said outlet or is released from the barrier to permit fluid flow from said inlet to said outlet, in dependence upon the volume of fluid within said control chamber; wherein said control means comprise a pilot valve comprising: a solid body having a surface which defines one boundary wall of a passage for fluid flow; an elastomeric member mounted with an exterior surface thereof facing but spaced from said solid body surface whereby to define another boundary wall of said passage; at least two spaced-apart ports opening into said passage through said solid body surface; at least one movable control element juxtaposed to the surface of said elastomeric member on its side opposite to said exterior surface; and a movable actuating member juxtaposed to said at least one control element and formed with at least one selected cam surface therefor; whereby movement of the actuating member is effective to displace said at least one control element against the elastomeric member, in a direction generally perpendicular to the movement of the actuating member and to the adjacent surface of the elastomeric member, thereby to deform at least one selected portion of the elastomeric member into sealing contact with the facing solid body surface so as to control intercommunication through said passage for fluid flow between said ports.

2. A valve according to claim 1 wherein the solid body defines a flat boundary wall of the aforesaid flow passage, the elastomeric member is a generally flat member disposed in parallel to said wall, and the actuating member is in the form of a spool with its axis disposed generally parallel to the plane of the elastomeric member.

3. A main valve according to claim 1 wherein the pilot valve has: an inlet port connected to the inlet of the main valve; an outlet port connected via an open/close valve to a region of lower fluid pressure than said inlet; and a control port connected to said control chamber; opening of said open/close valve when the main valve is closed being effective to permit fluid to flow out of said control chamber through the pilot valve to said region of lower fluid pressure, thereby opening the main valve.

4. A main valve according to claim 3 comprising conduit means bypassing the pilot valve to connect the inlet of the main valve to said control chamber; said conduit means including a second open/close valve operating in conjuction with the first-mentioned open/close valve so that as the first-mentioned valve opens the second valve closes and vice versa.

5. A main valve according to claim 3 wherein said open/close valve comprises a solid body having a surface which defines one boundary wall of a passage for fluid flow; an elastomeric member mounted with an exterior surfaces thereof facing but spaced from said solid body surface whereby to define another boundary wall of said passage; two spaced-apart ports opening into said passage through said solid body surface; at least one movable control element juxtaposed to the surface of said elastomeric member on its side opposite to said exterior surface; and a movable actuating member juxtaposed to said at least one control element and formed with at least one selected cam surface therefore; whereby movement of the actuating member is effective to displace the at least one said control element against the elastomeric member, in a direction generally perpendicular to the movement of the actuating member and to the adjacent surface of the elastomeric member, thereby to deform at least one selected portion of the elastomeric member into sealing contact with the facing solid body surface so as to control intercommunication through said passage for fluid flow between the said ports.

6. A main valve according to claim 3 wherein said actuating member is in the form of a spool having at least one respective land and groove to register with a respective said control element and configured such that: in a first position of the spool said inlet, outlet and control ports, of the pilot valve all intercommunicate through said passage; in a second successive position of the spool said inlet, outlet and control ports of the pilot valve are all isolated from one another, and in a successive third position of the spool said inlet and control ports of the pilot valve intercommunicate through said passage while said outlet port of the pilot valve is isolated from said inlet and control ports thereof.

7. A main valve according to claim 6 wherein said inlet and outlet ports of the pilot valve are spaced-apart longitudinally with respect to said solid body surface; first and second said control elements are located on said opposite side of the elastomeric member in register respectively with said inlet and outlet ports; and said actuating member is in the form of an axially moving spool having fist and second axially spaced grooves and first and second axially spaced lands joined respectively by first and second cam surfaces, a third cam surface of opposite slope to said first cam surface is provided to the opposite side of said first land, and said second land has a greater axial extend than said fist land; whereby in said first position of the spool said first and second control elements register respectively with said first and second grooves; in said second position of the spool said first and second control elements run up said first and second cam surfaces to register respectively with said first and second lands; and in said third position of the spool said first control element runs down said third cam surface while said second control element remains in register with said second land; and comprising additional flow restrictor means associated with said inlet port.

8. A main valve according to claim 6 wherein said spool of the pilot valve is connected to pressure-responsive means such that, in use, the position of the spool is controlaed in response to the fluid pressure pertaining at the outlet of the main valve.

9. A main valve according to claim 8 wherein the position of said spool is controlled such that, in use: when the pressure pertaining at said outlet is at a selected level the spool is in its said second position; if the pressure pertaining at said outlet falls below said selected level the spool is moved towards its said first position; and if the pressure pertaining at said outlet rises above said selected level the spool is moved towards its said third position.

10. A fluid flow control valve comprising: a solid body having a surface which defines an outer cylindrical boundary wall of a passage for fluid flow; an elastomeric member in the form of a sleeve disposed coaxially within said body with an exterior surface thereof facing but spaced from said solid body surface whereby to define another boundary wall of said passage; first, second and third ports opening into said passage through said solid body surface; at least two movable control elements juxtaposed to the surface of said elastomeric member on its side opposite to said exterior surface; and a movable actuating member in the form of a spool juxtaposed to said control elements and extending coaxially through the elastomeric member; said spool being formed with at least one respective land and groove to register with respective said control elements whereby movement of the spool is effective to displace the said control elements generally radially against the elastomeric member thereby to deform selected portions thereof into sealing contact with the facing solid body surface so as to control intercommunication through said passage for fluid flow between said ports and such that: in a first position of the spool said first, second and third ports all intercommunicate through said passage; in a second successive position of the spool said first, second and third ports are all isolated from one another; and in a successive third position of the spool said first and third ports intercommunicate through said passage while said second port is isolated from said first and third ports.

11. A valve according the claim 10 wherein each aforesaid control element comprises a ball trapped in a respective bore formed in a housing member disposed between the spool and the elastomeric member, and is located to deform the elastomeric member into sealing contact with the solid body surface around the opening of a respective said port.

12. A valve according to claim 10 wherein said first and second ports are spaced-apart axially with respect to said outer cylindrical wall; first and second said control elements are located inwards of said sleeve in register respectively with said first and second ports; and said spool is provided with first and second axially spaced grooves and first and second axially spaced lands joined respectively by first and second cam surfaces, a third cam surface of opposite slope to said first cam surface is provided to the opposite side of said first land, and said second land has a greater axial extent than said first land; whereby in said first position of the spool said first and second control elements register respectively with said first and second grooves; in said second position of the spool said first and second control elements run up said first and second cam surfaces to register respectively with said first and second lands; and in said third position of the spool said first control element runs down said third cam surface while second control element remains in register with said second land.

13. A valve according to claim 10 having additional flow restrictor means associated with said first port.

* * * * *